US007860987B2

(12) United States Patent
Fujisawa

(10) Patent No.: US 7,860,987 B2
(45) Date of Patent: Dec. 28, 2010

(54) APPARATUS FOR PROVIDING SERVICE IN RESPONSE TO USER REQUEST AND METHOD THEREFOR

(75) Inventor: Kunimasa Fujisawa, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1072 days.

(21) Appl. No.: 11/281,223

(22) Filed: Nov. 17, 2005

(65) Prior Publication Data
US 2006/0106915 A1 May 18, 2006

(30) Foreign Application Priority Data
Nov. 18, 2004 (JP) ............................. 2004-335007

(51) Int. Cl.
*G06F 15/16* (2006.01)
(52) U.S. Cl. ...................... 709/229; 709/203; 709/230; 719/315; 719/330; 713/201
(58) Field of Classification Search ................. 709/203, 709/230; 719/315, 330; 713/201
See application file for complete search history.

(56) References Cited

U.S. PATENT DOCUMENTS

| 6,226,752 | B1 * | 5/2001 | Gupta et al. ................... 726/9 |
| 6,629,127 | B1 * | 9/2003 | Deen et al. ................. 709/203 |
| 6,813,641 | B2 * | 11/2004 | Fomenko et al. ............ 709/230 |
| 6,950,875 | B1 * | 9/2005 | Slaughter et al. ............ 709/230 |
| 6,970,869 | B1 * | 11/2005 | Slaughter et al. .............. 707/10 |
| 7,072,967 | B1 * | 7/2006 | Saulpaugh et al. .......... 709/229 |
| 7,089,567 | B2 * | 8/2006 | Girardot et al. ............. 719/330 |
| 7,117,504 | B2 * | 10/2006 | Smith et al. ................. 719/328 |
| 7,395,333 | B1 * | 7/2008 | Saulpaugh et al. .......... 709/225 |
| 7,444,644 | B1 * | 10/2008 | Slaughter et al. ............ 719/315 |
| 2003/0093468 | A1 * | 5/2003 | Gordon et al. .............. 709/203 |
| 2004/0034860 | A1 * | 2/2004 | Fernando et al. ............ 719/315 |
| 2005/0014489 | A1 * | 1/2005 | Zhigang .................. 455/414.2 |

FOREIGN PATENT DOCUMENTS

JP    2001-051946 A    2/2001

* cited by examiner

*Primary Examiner*—Firmin Backer
*Assistant Examiner*—James Q Forman
(74) *Attorney, Agent, or Firm*—Canon U.S.A., Inc. I.P. Division

(57) ABSTRACT

An apparatus for providing a service in response to a request from a user includes a service program that implements a service, an operational processing program that controls processing in accordance with the service program, and a contact program that sets up an environment for executing the service program and the operational processing program. The contact program is activated, the service program is activated and is registered in the contact program, the operational processing program is activated and is registered in the contact program, and the service program registered in the contact program is registered in the operational processing program registered in the contact program. Thus, reception of a request and the service implemented by the service program are activated, and the timing of executing the service program provided in response to a user request is easily and accurately controlled.

15 Claims, 13 Drawing Sheets

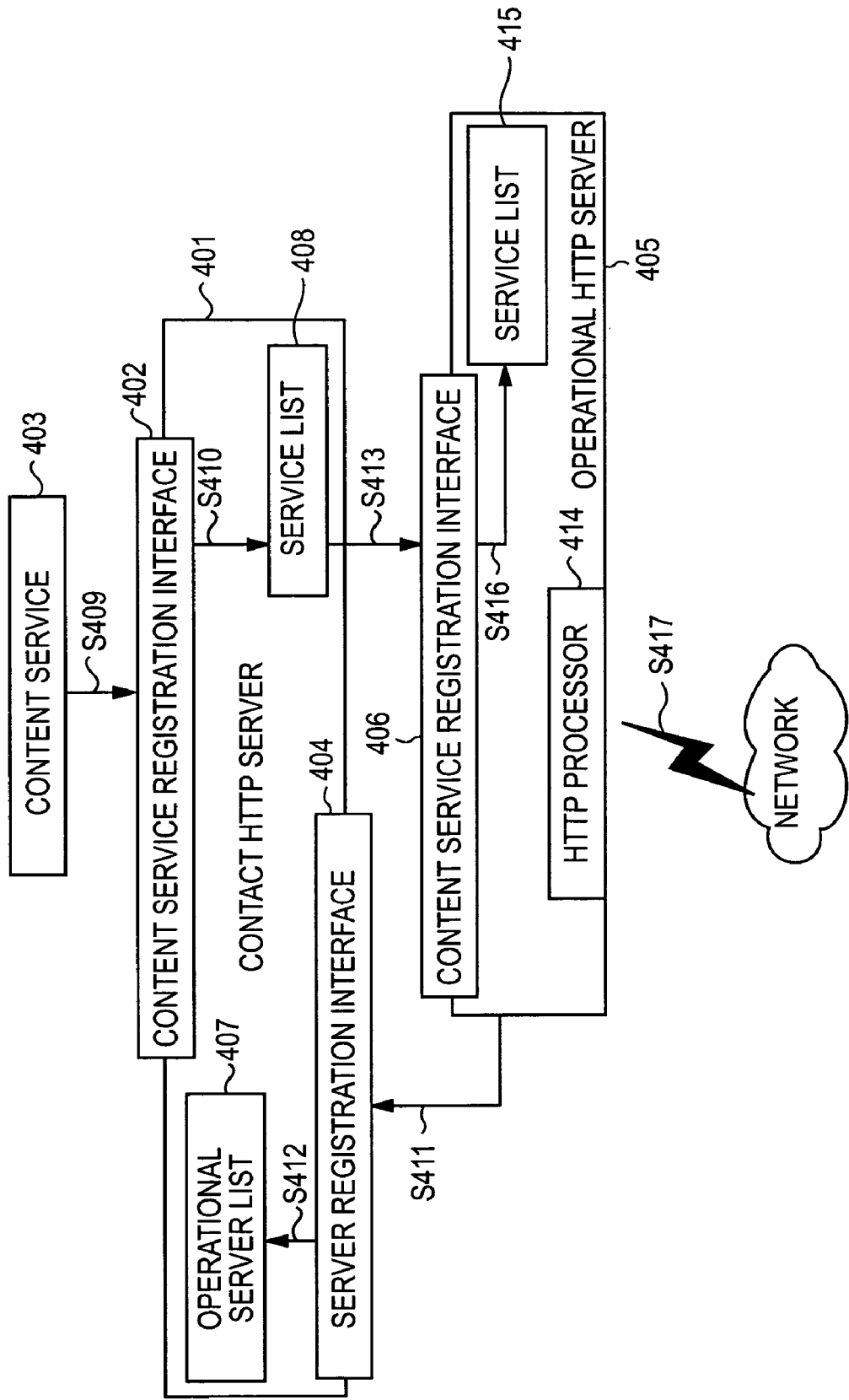

FIG. 4

```
public interface HttpService {
        public void registerServlet(java.lang.String alias, javax.servlet.Servlet servlet
        public void unregister(java.lang.String alias);
}
```

FIG. 5

```
    public interface RootHttpService { public void registerHttpService(HttpService httpService);
            public void unRegisterHttpService();
    }
```

FIG. 6

```
    public interface RootHttpService { public void registerHttpService
                    (int type, HttpService httpService);
            public void unRegisterHttpService(int type);
    }
```

FIG. 7

```
    public interface RootHttpService { public void register80HttpService(HttpService httpService);
            public void register88HttpService(HttpService httpService);
            public void unRegister80HttpService();
            public void unRegister88HttpService();
    }
```

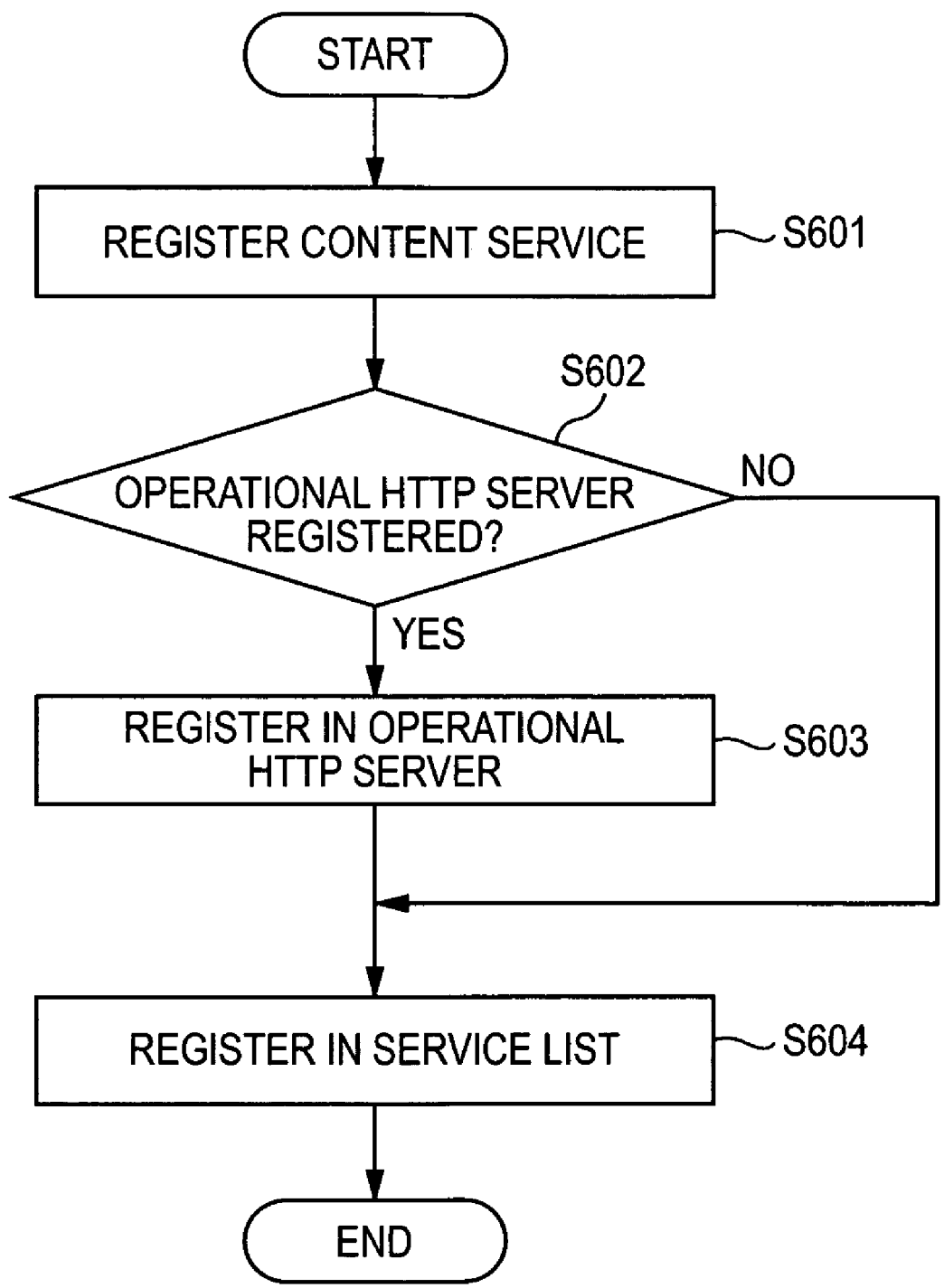

FIG. 11

```
public interface HttpService {
        public void registerServlet(int port, java.lang.String alias,
                java.servlet.Servlet servlet
        public void unregister(java.lang.String alias);
}
```

FIG. 12

```
public interface HttpService {
        public void register80Servlet(java.lang.String alias,
                javax.servlet.Servlet servlet
        public void unregister(java.lang.String alias);
} public interface HttpService {
        public void register88Servlet(java.lang.String alias,
                javax.servlet.Servlet servlet
        public void unregister(java.lang.String alias);
}
```

FIG. 13

| CONTENT SERVICE | PORT NO. |
|---|---|
| SERVLET A | 80 |
| SERVLET B | 88 |
| ⋮ | ⋮ |

| | 1701 | 1702 |
|---|---|---|
| | OPERATIONAL HTTP SERVER | PORT NO. |
| | OPERATIONAL HTTP SERVER 1 | 80 |
| | OPERATIONAL HTTP SERVER 2 | 88 |
| | ⋮ | ⋮ |

APPARATUS FOR PROVIDING SERVICE IN RESPONSE TO USER REQUEST AND METHOD THEREFOR

BACKGROUND OF THE INVENTION

1. Field of the Invention

The present invention relates to an information processing apparatus realizing a server function for providing a service in response to a request from a user, a method for controlling the information processing apparatus, and a program.

2. Description of the Related Art (1) Application Execution Server

Referring to FIG. 17, an embedded device 101 has many limitations in terms of resources, such as a memory and a central processing unit (CPU). In a case of executing a plurality of programs, the embedded device 101 does not generally cause the programs to simply operate as separate processes, but in many cases uses an application execution server 102 for managing execution of the programs. It is common to execute various application programs in the processing of the application execution server 102. One example of an application execution server is an OSGi server.

The OSGi server is an application execution server specified by the OSGi Alliance for managing execution of a plurality of Java® programs on an embedded device such as a home gateway. Java® is a programming language and a program execution environment developed and defined by Sun Microsystems®, Inc., U.S.A.

A hypertext transfer protocol (HTTP) service 103 is an implementation of an HTTP server. A content service 104 includes a program for extending the functionality of an HTTP server, called a servlet, and hypertext markup language (HTML) data. A servlet is an HTTP-server extension interface developed and defined by Sun Microsystems®, Inc., U.S.A., and is written in the Java® language.

The HTTP service 103, the content service 104, and other services 105 are equally handled as a single service program and are started and stopped by the application execution server 102.

The HTTP service 103 includes an application program interface (API) for registering the content service 104. The content service 104, when activated, is registered in the HTTP service 103 through the API. This allows a user to use the content service 104 through the HTTP service 103.

The API ability of the HTTP service 103 to register the content service 104 allows dynamic registration and deletion of servlets and content services such as HTML data with respect to the HTTP service 103 that is in operation.

(2) Extension Program for HTTP Server

Most of the recent HTTP servers implemented have functions for static transfer of files stored in the servers, such as HTML files and image files, to clients and for dynamic generation and transfer of data to clients. Typical extension program interfaces include a servlet interface and Common Gateway Interface (CGI). The use of such servlet or CGI functions allows interactive transaction with a user who uses a client.

(3) HTML Form

Current Web clients enable forms defined in HTML, which is a structure description language, to be displayed on browsers. A user can fill in an HTML form displayed on a browser of a Web client and can submit it to an HTTP server. The HTML form includes various control items, such as a text field, a text field for password entry, a radio button, a list, a check box, a file transfer form, a submit button, and a cancel button.

(4) Script Language

Many current Web clients are capable of executing a script language written in HTML data transmitted from an HTTP server. The script language also allows data generated by performing processing, such as encryption, on the user input in the HTML form to be submitted to the HTTP server. ECMA Script (Java Script) is a script language.

(5) Web Authentication Scheme

As Web authentication schemes, BASIC authentication and Digest authentication, which are specified by RFC 2068, have widely been supported, as disclosed in, for example, Japanese Patent Laid-Open No. 2001-51946. Servlet authentication using the servlet or CGI (Common Gateway Interface) technology has also been widely used. BASIC authentication and Digest authentication are authentication schemes implemented in an HTTP server, and only use a user interface (UI) through which two values, namely, an ID embedded in the Web browser and a password, are input by the user. There are further limitations in that only an ID and a password or an ID and a digested password are exchanged between an HTTP server and a browser (or Web client), a stronger authentication system cannot be additionally provided, etc.

Although it is necessary to add an authentication program to an HTTP server as an extension program such as a servlet or CGI program to realize an authentication system, servlet authentication allows a user to arbitrarily generate HTML form data as an implementation of the authentication UI. Servlet authentication further allows a user input encrypted by an encryption method desired by a user using a script language to be submitted to the HTTP server, or allows an authentication server used when the user logs in to be specified. Therefore, a user-friendly secure authentication system can be achieved.

Furthermore, by exchanging servlets for authentication (i.e., authentication servlets), various authentication schemes can be used depending on the application purpose of the device.

The HTTP service 103 on the application execution server 102 also registers and executes an authentication servlet service as a content service, thus achieving a more user-friendly authentication system.

With the use of the aforementioned technology, an HTTP server of the related art can achieve a high-flexibility authentication system. However, an extension program including an authentication servlet is enabled as a portion of the server program when the server is turned on. It is therefore difficult to dynamically register the extension program including the authentication servlet in the running HTTP server.

Therefore, there is no flexibility in exchanging an extension program including an authentication servlet. Moreover, many resource-limited devices, such as the embedded device 101, are not capable of changing the setting of the server program so as to execute an extension program including different authentication servlets.

In order to overcome such problems, an HTTP service running on an OSGi server serving as an application execution server is designed so that an extension program including an authentication servlet can dynamically be added to the running HTTP service. However, a combination of the HTTP service 103 of the related art and the authentication servlet service on the application execution server 102 causes the following problems.

FIGS. 18 and 19 are diagrams illustrating problems with the related art. The authentication servlet service, when activated, obtains the HTTP service 103 registered in the application execution server 102 and registers itself in the HTTP service 103. It is therefore necessary to activate the HTTP service 103 before activating the authentication servlet service. Therefore, the HTTP service 103 is generated and activated first (step S201).

Then, the authentication servlet service is registered (step S203). In case of access from a client after the authentication servlet service is activated, authentication is performed (step S204). However, a problem arises in case of access from a client for a period of time between the generation and activation processing of the HTTP service (step S201) and the activation processing of the authentication servlet service (step S203). In this case, the authentication servlet service has not yet been activated when the access occurs, and the client is allowed to access the HTTP service without authentication (step S202).

FIG. 19 shows a method for separately performing generation and activation of the HTTP service 103 in order to overcome the above-described problem. First, the HTTP service 103 is generated (step S301), and, then, the authentication servlet service is registered in the HTTP service 103 (step S303). Next, the HTTP service 103 is activated (step S305), and the general content service 104 is then registered (step S307).

Since the HTTP service 103 has not yet been activated even after the HTTP service 103 is generated, access from a client is not received (step S302). Moreover, even after the authentication servlet service is registered, the HTTP service 103 has not yet been activated, and access from a client is not received (step S304). After the HTTP service 103 is activated, in response to access from a client, authentication of the authentication servlet service is carried out (step S306).

However, the method shown in FIG. 19 has a problem in that the procedure for the application execution server 102 to register the authentication servlet service becomes more complicated.

Moreover, since generation and activation of the HTTP service 103 are separately performed, the number of service statuses to be managed by the application execution server 102 increases.

Furthermore, it is necessary to perform registration of the authentication servlet service between generation and activation of the HTTP service 103. Thus, the application execution server 102 needs to manage a sequence of operations, such as generation of the HTTP service 103, registration of the authentication servlet service, and activation of the HTTP service 103, in the activation processing of various services.

SUMMARY OF THE INVENTION

The present invention provides an information processing apparatus capable of easily and accurately controlling the timing of executing a service program provided in response to a user request, a method for controlling the information processing apparatus, and a program.

According to one aspect, the present invention relates to an information processing apparatus for providing a service in response to a request from a user. The information processing apparatus includes a storage unit and a controller. The storage unit is configured to store a service program that implements the service to be provided, an operational processing program that receives the request and that controls processing in accordance with the service program in response to the request, and a contact program in which the service program and the operational processing program are registered to set up an environment for executing the registered service program and operational processing program. The controller performs control so that the request is received in a state where the service implemented by the service program is active by activating the contact program, activating and registering the service program in the contact program, activating and registering the operational processing program in the contact program, and registering, in the operational processing program registered in the contact program, the service program registered in the contact program.

According to another aspect, the present invention relates to a method for controlling an information processing apparatus for providing a service in response to a request from a user. The method includes a storing step of storing in a storage unit a service program that implements the service to be provided, an operational processing program that receives the request and that controls processing in accordance with the service program in response to the request, and a contact program in which the service program and the operational processing program are registered to set up an environment for executing the registered service program and operational processing program, and a controlling step of performing control so that the request is received in a state where the service implemented by the service program is active by activating the contact program, activating and registering the service program in the contact program, activating and registering the operational processing program in the contact program, and registering, in the operational processing program registered in the contact program, the service program registered in the contact program.

Other features besides those discussed above shall be apparent to those skilled in the art from the description of exemplary embodiments of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 3 is a diagram showing an exemplary system configuration of the information processing apparatus according to the first embodiment.

FIG. 4 is a diagram showing an example interface description of a content service registration interface in the first embodiment.

FIG. 5 is a diagram showing an example interface description of a server registration interface in the first embodiment.

FIG. 6 is a diagram showing an example interface description of a server registration interface in the first embodiment.

FIG. 7 is a diagram showing an example interface description of a server registration interface in the first embodiment.

FIG. 8 is a flowchart showing an operational HTTP server registration process in the first embodiment.

FIG. 11 is a diagram showing an example interface description of a content service registration interface in a second embodiment of the present invention.

FIG. 12 is a diagram showing an example interface description of a content service registration interface in the second embodiment.

FIG. 13 is a diagram showing an exemplary service list in the second embodiment.

FIG. 14 is a diagram showing an exemplary operational server list in the second embodiment.

DESCRIPTION OF THE EMBODIMENTS

Exemplary embodiments of the present invention will now be described in detail below with reference to the accompanying drawings.

In the following description, the term "server" includes, but is not limited to, a Web server and an application server. The Web server (including an HTTP server) is a device adapted to store information, such as HTML documents and images, in a World Wide Web (WWW) system and to transmit the information via a network in response to a request from client software such as a Web browser. The application server (or Web application server) is a middle-tier device having a function for performing processing between reception of a request from a user over a network and processing of a database system or the like.

The term "client" means a computer and software which use functions or data provided by a server on a network. Client devices include, but are not limited to, a computer connected to the network, a home-use personal computer, and a Web browser and a viewer running on the computer.

The network is typically implemented as any one of the Internet, a local area network (LAN), a wide area network (WAN), a telephone network, a dedicated digital network, an asynchronous transfer mode (ATM) network, a frame relay network, a communication satellite network, a cable television network, and a wireless network for data broadcasting, or a combination thereof. Thus, any communication network capable of transmission and reception of data may be used.

First Embodiment

As described above, it is difficult for a personal computer (PC) that is designed so that a plurality of processes are allocated to each of the programs to take a general action for executing a plurality of programs on an embedded resource-limited device or the like. It is common to provide an application execution server that is adapted to manage execution of a plurality of programs on a single process and to execute the plurality of programs on the application execution server.

The basic configuration of an information processing apparatus as an implementation of an embedded device, such as a PC, will now be described below with reference to FIG. 1.

Figure 1:
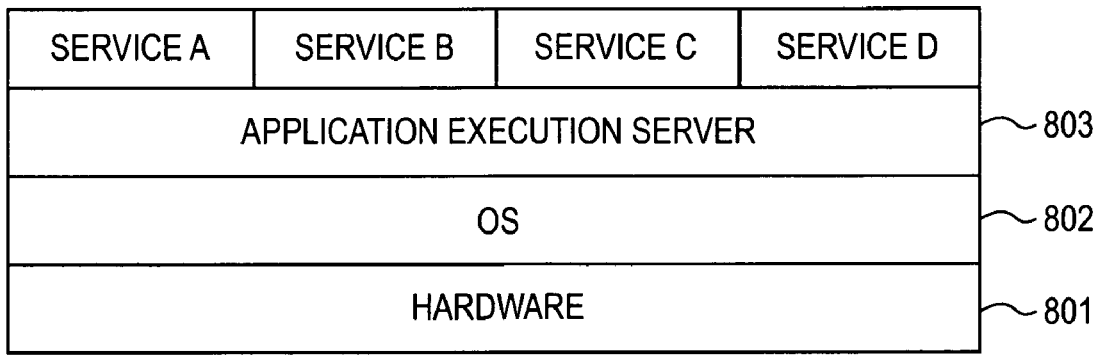
FIG. 1 is a diagram showing the basic structure of an information processing apparatus according to a first embodiment of the present invention.

FIG. 1 shows the basic configuration of an information processing apparatus according to a first embodiment of the present invention.

As shown in FIG. 1, an operating system (OS) 802 operates on hardware 801, and an application execution server 803 operates on the OS 802. The OS 802 and the application execution server 803 may be integrated into one unit.

A plurality of programs referred to as services (services A to D) are executed on the application execution server 803. The application execution server 803 performs life-cycle management for installing, executing, stopping, and uninstalling the services, management of resources used for the services, etc.

The application execution server 803 not only performs life-cycle management for the services but also plays an intermediate role to share a function among the services.

The hardware 801 includes standard components mounted in a general-purpose computer (e.g., a CPU, a random access memory (RAM), a read-only memory (ROM), a hard disk, an external storage device, a network interface, a display, a keyboard, a mouse, etc.).

Various programs discussed below (including an extension program, a contact HTTP server program, and an operational HTTP server program) are stored in a storage medium, e.g., the hard disk or the ROM. The CPU reads the programs from the storage medium, loads and stores the read programs into a memory (such as the RAM), and controls execution of the programs.

An example operation of the application execution server 803 will now be described with reference to FIG. 2.

Figure 2:
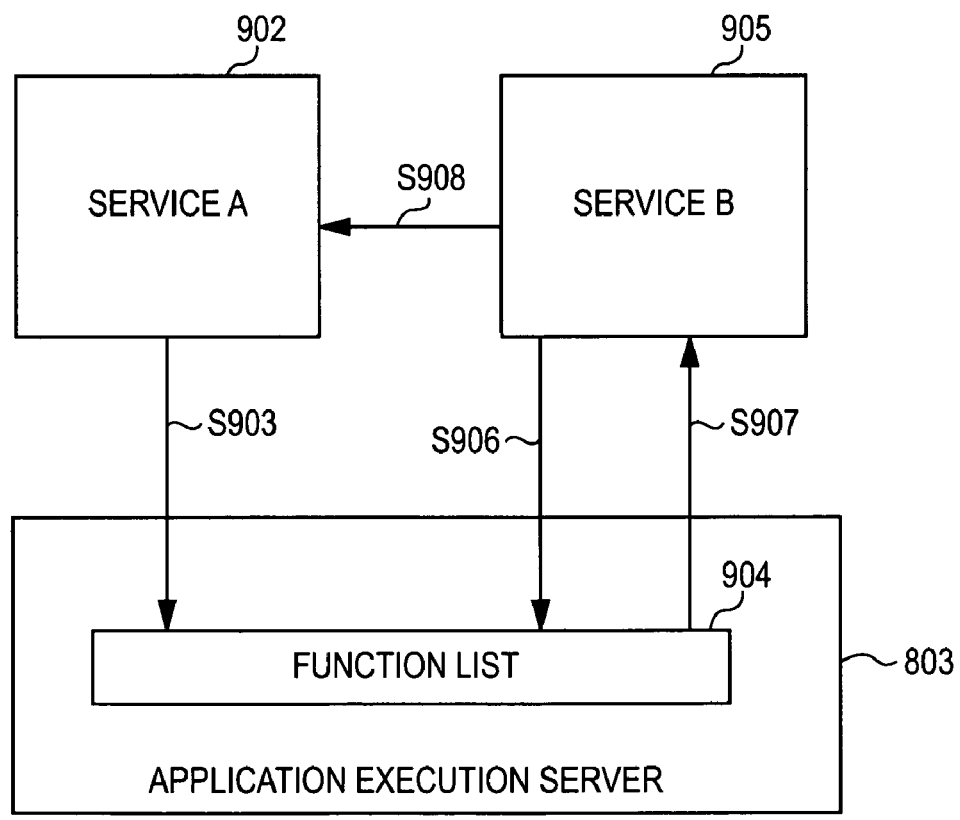
FIG. 2 is a diagram showing an example operation of an application execution server according to the first embodiment.

FIG. 2 is a diagram showing an example operation of the application execution server 803 according to the first embodiment.

As shown in FIG. 2, a service A (902) registers a function of the service A (902) in the application execution server 803 so that other services can use the function of the service A (902) (step S903). The application execution server 803 stores information relating to the registered function in a function list 904.

A service B (905) that is to use the function provided by the service A (902) issues a request for function search to the application execution server 803 (step S906). In response to the request, the application execution server 803 searches the function list 904 for the service which provides the target function, and notifies the service B (905) if this service is found (step S907). The service B (905) issues a function request to the service A (902) which has the function notified by the application execution server 803 (step S908).

A specific system configuration according to the first embodiment will now be described with reference to FIG. 3. FIG. 3 shows a system configuration according to the first embodiment.

In the first embodiment, an HTTP server program is divided into a contact HTTP server (or contact program) 401 and an operational HTTP server (or operational processing program) 405. The contact HTTP server 401 serves as a contact device for registering an extension program such as a content service. The operational HTTP server 405 receives a request from a client and performs HTTP processing (or processing in accordance with the HTTP protocol) in response to the request. Such a configuration prohibits (or prevents) reception of access from the client before an authentication system (or authentication program) is enabled, which will now be described.

The contact HTTP server 401 serves as a contact device for registering the content service 403, such as a servlet and HTML data, and does not have functions for receiving a request from a client over a network, performing processing in accordance with the HTTP protocol, and transmitting a response.

That is, the contact program is a program that does not perform processing in accordance with the HTTP protocol and that performs processing in cooperation with the operational processing program. The contact program is also a program that registers therein the extension program and the operational processing program to establish an environment for executing both programs. The operational processing program is a program that performs processing in accordance with the HTTP protocol and that performs processing in cooperation with the contact program.

Referring to FIG. 3, the contact HTTP server 401 includes a content service registration interface 402 for registering the content service 403, and a server registration interface 404 for registering the operational HTTP server (or operational HTTP server service) 405. The registration interfaces 402 and 404 are registered in the application execution server 803 shown in FIG. 2.

The content service registration interface 402 is provided in such an interface description as shown in FIG. 4, and is registered in the application execution server 803.

In a case of one operational HTTP server 405, the server registration interface 404 is provided in such an interface description as shown in, for example, FIG. 5, and is registered in the application execution server 803. In a case where an operational HTTP server 405 is executed using several network ports, the server registration interface 404 is provided in such an interface description as shown in, for example, FIG. 6 or FIG. 7, and is registered in the application execution server 803.

The contact HTTP server 401 further includes an operational server list 407 and a service list 408. The operational server list 407 stores an identification of the operational HTTP server 405 registered by the server registration interface 404. The service list 408 stores an identification of the content service 403 registered by the content service registration interface 402.

The operational HTTP server 405 includes a content service registration interface 406, an HTTP processor 414, and a service list 415. The content service registration interface 406 registers a content service. The service list 415 stores an identification of the content service registered by the content service registration interface 406. The HTTP processor 414 performs the handling of the HTTP communications.

After power-on, the HTTP processor 414 opens a server socket, and waits for a request from a client. Upon receipt of a request from a client (step S417), the HTTP processor 414 interprets the request, and searches the service list 415 for the requested content service. Then, data to be transmitted to the client is retrieved from the requested content service, or request data is passed as an argument to the content service so that result data is retrieved from the content service.

HTTP header data is added to the retrieved data, and the resulting data is transmitted to the client. If the HTTP processor 414 fails to find the requested content service in the service list 415 or if the content service returns an error, the HTTP processor 414 sends an error message to the client.

The content service registration interface 402, when activated, obtains the contact HTTP server (or contact HTTP server service) 401, and registers the content service 403 in the obtained contact HTTP server 401. In response to a call from the operational HTTP server 405 according to the request from the client, the contact HTTP server 401 generates data to be transmitted to the client.

The application execution server 803 only stores the order in which the service programs are to be activated. According to the order, the application execution server 803 activates, first, the contact HTTP server 401, and, then, the content service 403. The content service 403 obtains, in its activation sequence, the content service registration interface 402 of the contact HTTP server 401 registered in the application execution server 803. The content service 403 registers itself in the contact HTTP server 401 using the obtained content service registration interface 402 (step S409).

The content service 403 activated at this time may be either an authentication servlet service or a general content service, or a combination thereof.

Figure 9:
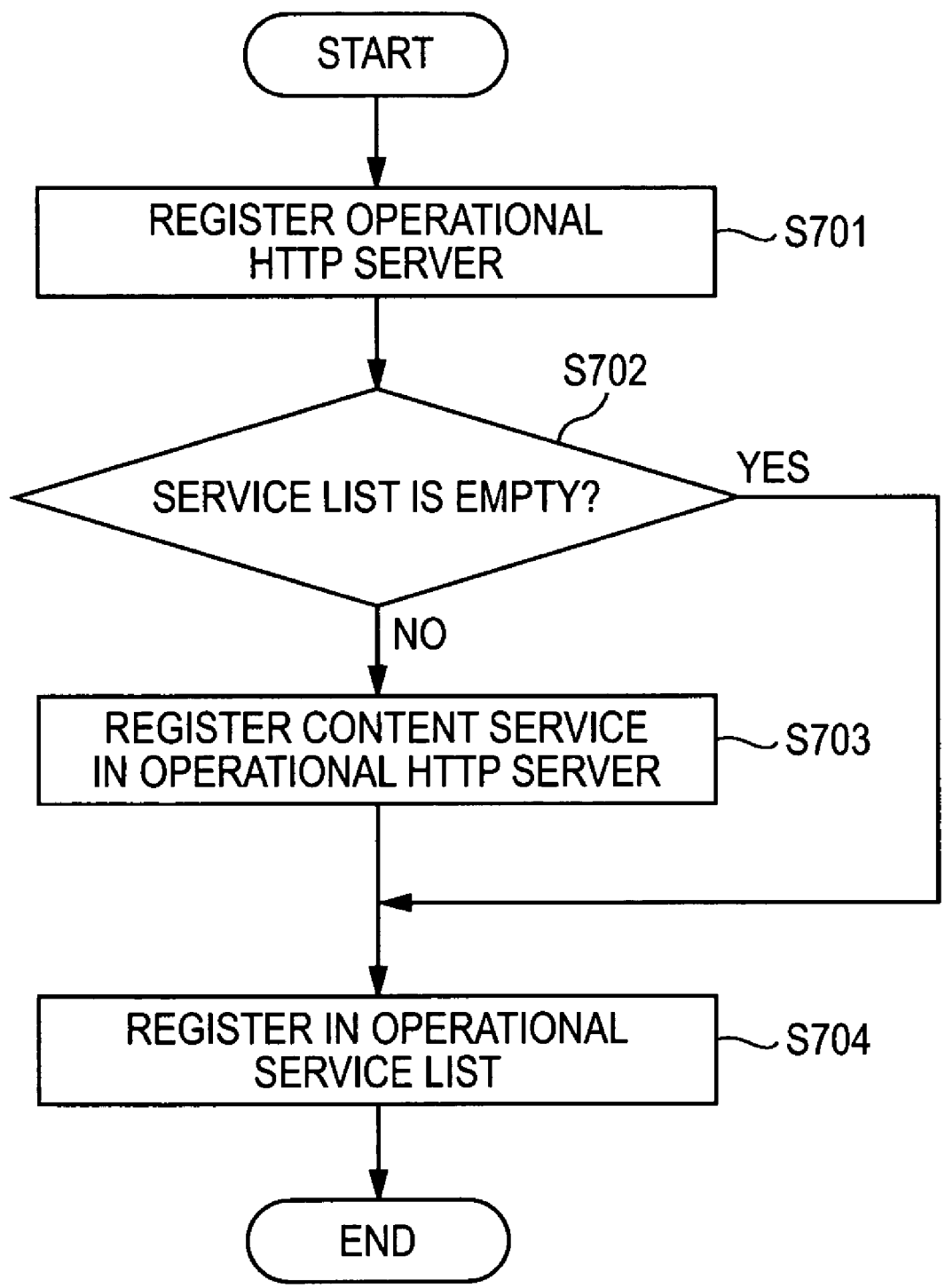
FIG. 9 is a flowchart showing the operational HTTP server registration process in the first embodiment.

The registration of the content service 403 and the operational HTTP server 405 according to the first embodiment will now be described with reference to FIGS. 8 and 9.

FIG. 8 is a flowchart showing a content service registration process according to the first embodiment. FIG. 9 is a flowchart showing an operational HTTP server registration process according to the first embodiment.

Referring to FIG. 8, the content service 403 is registered in the contact HTTP server 401 (step S601). The contact HTTP server 401 determines whether or not the operational HTTP server 405 has been registered in the operational server list 407 of the contact HTTP server 401 (step S602). At this point in time, the operational HTTP server 405 has not yet been activated, and there is no operational HTTP server 405 registered in the operational server list 407 (No in step S602). The content service 403 is registered in the service list 408 (step S604; step S410 shown in FIG. 3).

After activation of the content service 403 is completed, the operational HTTP server 405 is activated. Referring to FIG. 9 the operational HTTP server 405 obtains, in its activation sequence, the server registration interface 404 of the contact HTTP server 401 registered in the application execution server 803. The operational HTTP server 405 registers itself in the contact HTTP server 401 using the server registration interface 404 (step S701; step S411 shown in FIG. 3).

When the operational HTTP server 405 is registered, the contact HTTP server 401 determines whether or not the service list 408 is empty (step S702). If the service list 408 is not empty (No in step S702), the content service 403 registered in the service list 408 is registered in the operational HTTP server 405 registered in step S701 (step S703; step S413 shown in FIG. 3), using the content service registration interface 406 of the operational HTTP server 405. The operational HTTP server 405 registered in step S701 is registered in the operational server list 407 (step S704; step S412 shown in FIG. 3).

If the service list 408 is empty (Yes in step S702), the operational HTTP server 405 registered in step S701 is registered in the operational server list 407 (step S704; step S412 shown in FIG. 3).

The operational HTTP server 405 stores in the service list 415 the content service 403 registered from the contact HTTP server 401 in step S703 (step S416 shown in FIG. 3). After the content service 403 is registered in the operational HTTP server 405, the operational HTTP server 405 opens the server port, and starts receiving access from a client.

One or a plurality of operational HTTP servers 405 each provided for each network port via which an HTTP request is received may be registered in the operational server list 407.

The activation sequence of the operational HTTP server 405 is implemented by the operational HTTP server 405, and the registration of the operational HTTP server 405 in the contact HTTP server 401 is also a closed process between the contact HTTP server 401 and the operational HTTP server 405. Thus, it is only required that the application execution server 803 activates the operational HTTP server 405.

After activation of the operational HTTP server 405, when the content service 403 is activated, the content service 403 registers, in its activation sequence, itself in the contact HTTP server 401 using the content service registration interface 402.

That is, in FIG. 8, the content service 403 is registered in the contact HTTP server 401 (step S601). The contact HTTP server 401 determines whether or not the operational HTTP server 405 has been registered in the operational server list 409 of the contact HTTP server 401 (step S602). At this point in time, the operational HTTP server 405 has been activated and registered (Yes in step S602). Then, the content service 403 is registered in the operational HTTP server 405 using the content service registration interface 406 of the operational HTTP server 405 (step S603). The content service 403 is then registered in the service list 408 (step S604).

Figure 10:
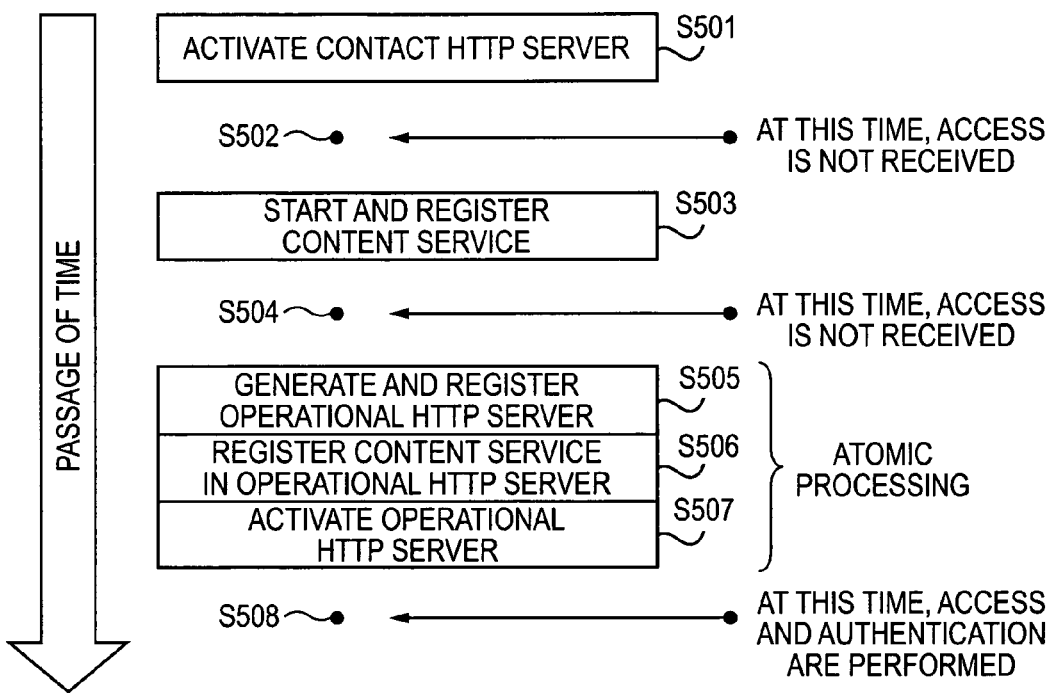
FIG. 10 is a diagram showing an operation flow of a system.

FIG. 10 is a chart showing an operation flow of the system. With the above-described configuration of the contact HTTP server 401 and the operational HTTP server 405, the contact HTTP server 401 is activated (step S501). At this point in time, a request from a client is not received because the operational HTTP server 405 that actually receives an HTTP request is not present, and no server information is returned to the client (step S502).

Then, the content service 403 including an authentication servlet and a general content service is started and is registered in the contact HTTP server 401 (step S503). The operational HTTP server 405 that actually receives an HTTP request is still not present at this point in time, and a request from a client is not received (step S504).

Then, the operational HTTP server 405 is generated and is registered in the contact HTTP server 401 (step S505), the content service 403 is registered in the operational HTTP server 405 from the contact HTTP server 401 (step S506), and the operational HTTP server 405 is activated (step S507). The processing of steps S505 to S507 is performed as an atomic transaction in the activation sequence of the operational HTTP server 405, and the activation of the operational HTTP server 405 (i.e., the activation of the HTTP server function) is completed. At the time of completion of the activation of the operational HTTP server 405, the authentication servlet in the content service 403 has been registered in the operational HTTP server 405. Thus, access from a client can be received in a state where the authentication system is active (S508).

According to the first embodiment, therefore, the HTTP server program is divided into the contact HTTP server 401 serving as a contact device for registering an extension program such as a content service and the operational HTTP server 405 that receives a request from a client and that performs HTTP processing in response to the request. Thus, reception of access from a client is prohibited until the authentication system (authentication program) operates.

Accordingly, division of the HTTP server program into two HTTP server functions prevents an HTTP service from being executed without an authentication servlet, and achieves a secure HTTP service without a complicated application execution server.

Moreover, on the application execution server, it is only required that the order in which the services are to be started is managed without performing complex state management of various services to be started. Therefore, the application execution server can be implemented in a simple manner. Due to the feature that the application execution server is designed to totally manage the services, the simple implementation of the application execution server increases the system performance and reduces bugs.

Second Embodiment

A second embodiment of the present invention provides an exemplary application of the first embodiment, and relates to the configuration in an environment for specifying a network port number on which the operational HTTP server 405 that can invoke a content service operates.

In the second embodiment, the same components as in the first embodiment are illustrated using the same reference numerals.

In the second embodiment, as shown in FIG. 3, a contact HTTP server 401 includes a content service registration interface 402 for registering a content service 403, and a server registration interface 404 for registering an operational HTTP server 405. The registration interfaces 402 and 404 are registered in the application execution server 803 shown in FIG. 2.

The content service registration interface 402 is an interface capable of specifying a network port number on which the operational HTTP server 405 that can invoke a content service operates. A network port number may be specified as an argument. Alternatively, a different registration interface may be provided for each network port.

For example, when a network port number is specified as an argument, the content service registration interface 402 is provided in such an interface description as shown in, for example, FIG. 11, and is registered in the application execution server 803. When a different registration interface is provided for each network port, the content service registration interface 402 is provided in such an interface description as shown in, for example, FIG. 12, and is registered in the application execution server 803.

The server registration interface 404 is an interface capable of registering an operational HTTP server 405 and a network port number on which the operational HTTP server 405 operates. A network port number may be specified as an argument. Alternatively, a different registration interface may be provided for each network port.

When the operational HTTP server 405 is executed using several network ports, the server registration interface 404 can specify as an argument a network port number on which the operational HTTP server 405 operates. In this case, the server registration interface 404 is provided in such an interface description as shown in, for example, FIG. 6, and is registered in the application execution server 803. When a different registration interface is provided for each network port, the server registration interface 404 is provided in such an interface description as shown in, for example, FIG. 7, and is registered in the application execution server 803.

The contact server 401 further includes, for example, a service list 408 as shown in FIG. 13 and an operational server list 407 as shown in FIG. 14. The service list 408 stores an identification of the content service 403 registered by the content service registration interface 402. The operational server list 407 stores an identification of the operational HTTP server 405 registered by the server registration interface 404.

As shown in FIG. 13, the service list 408 stores content service information 1601 (e.g., a content service name). The service list 408 also stores network port number information 1602 (e.g., a port number) on which the operational HTTP server that can invoke the corresponding content service is executed.

As shown in FIG. 14, the operational server list 407 stores operational HTTP server information 1701 (e.g., an operational HTTP server name), and network port number information 1702 (e.g., a port number) on which the corresponding operational HTTP server is executed.

The contact HTTP server 401 serves as a contact device for registering the content service 403, and does not have functions for receiving a request from a client, performing processing in accordance with the HTTP protocol, and transmitting a response, etc.

The operational HTTP server 405 includes a content service registration interface 406, a service list 415, and an HTTP processor 414. The content service registration interface 406 registers the content service 403 from the contact HTTP server 401. The service list 415 stores the content service 403 registered by the content service registration interface 406. The HTTP processor 414 performs the handling of the HTTP communications.

After power-on, the HTTP processor 414 opens a server socket, and waits for a request from a client. Upon receipt of a request from a client, the HTTP processor 414 interprets the request, and searches the service list 415 for the requested content service. Then, data to be transmitted to the client is retrieved from the requested content service, or request data is passed as an argument to the content service so that result data is retrieved from the content service.

HTTP header data is added to the retrieved data, and the resulting data is transmitted to the client. If the HTTP processor 414 fails to search for the requested content service in the service list 415 or if the content service returns an error, the HTTP processor 414 sends an error report to the client.

The content service registration interface 402, when activated, obtains the contact HTTP server (or contact HTTP server service) 401, and registers the content service 403 in the obtained contact HTTP server 401. In response to a call from the operational HTTP server 405 according to the request from the client, the contact HTTP server 401 generates data to be transmitted to the client.

The application execution server 803 only stores the order in which the service programs are to be activated. According to the order, the application execution server 803 activates, first, the contact HTTP server 401, and, then, the content service 403. The content service 403 obtains, in its activation sequence, the content service registration interface 402 of the contact HTTP server 401 registered in the application execution server 803. The content service 403 registers itself in the contact HTTP server 401 using the obtained content service registration interface 402 (step S409).

The content service 403 activated at this time may be either an authentication servlet service or a general content service, or a combination thereof.

The registration of the content service 403 and the operational HTTP server 405 according to the second embodiment will now be described with reference to FIGS. 15 and 16.

Figure 15:
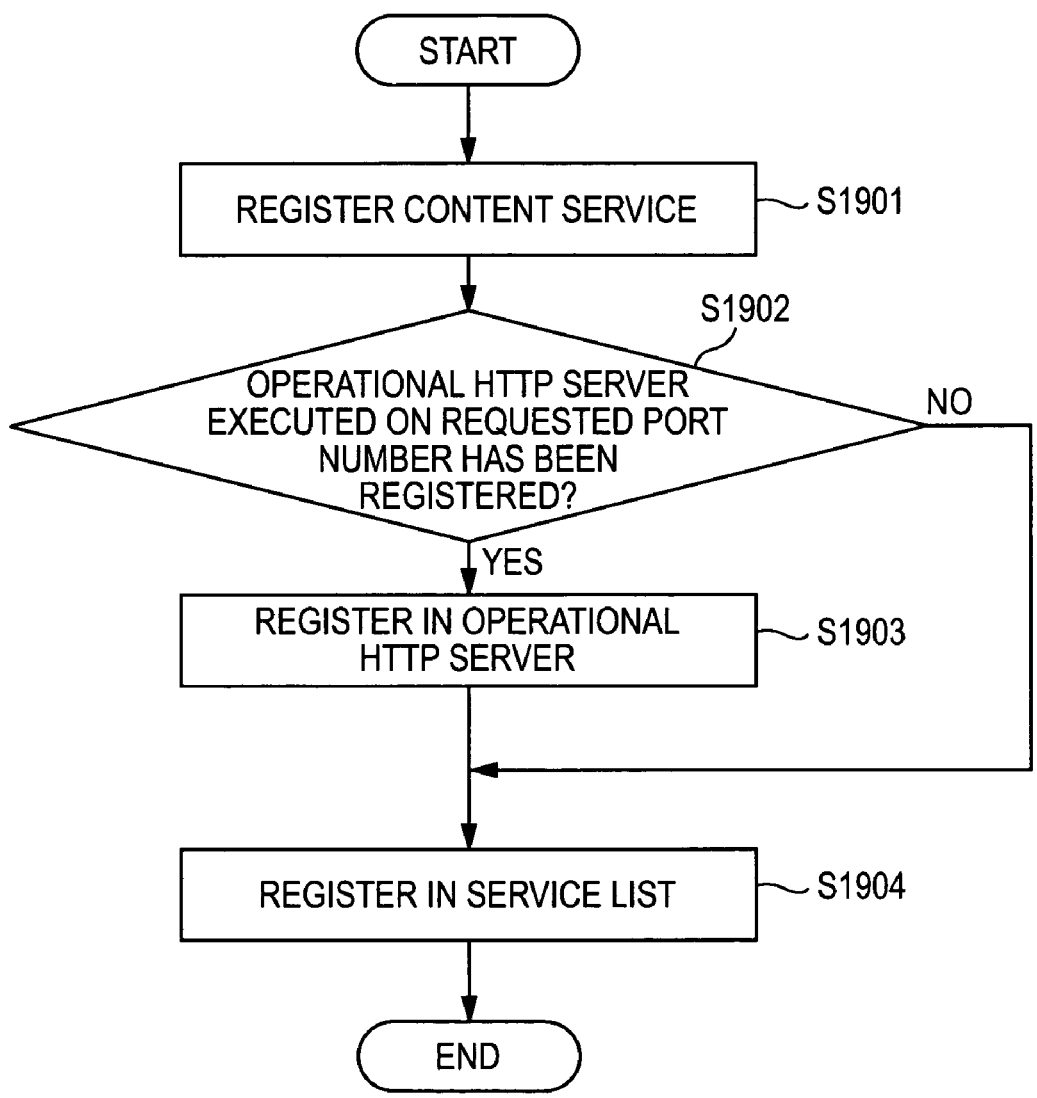
FIG. 15 is a flowchart showing a content service registration process in the second embodiment.
Figure 16:
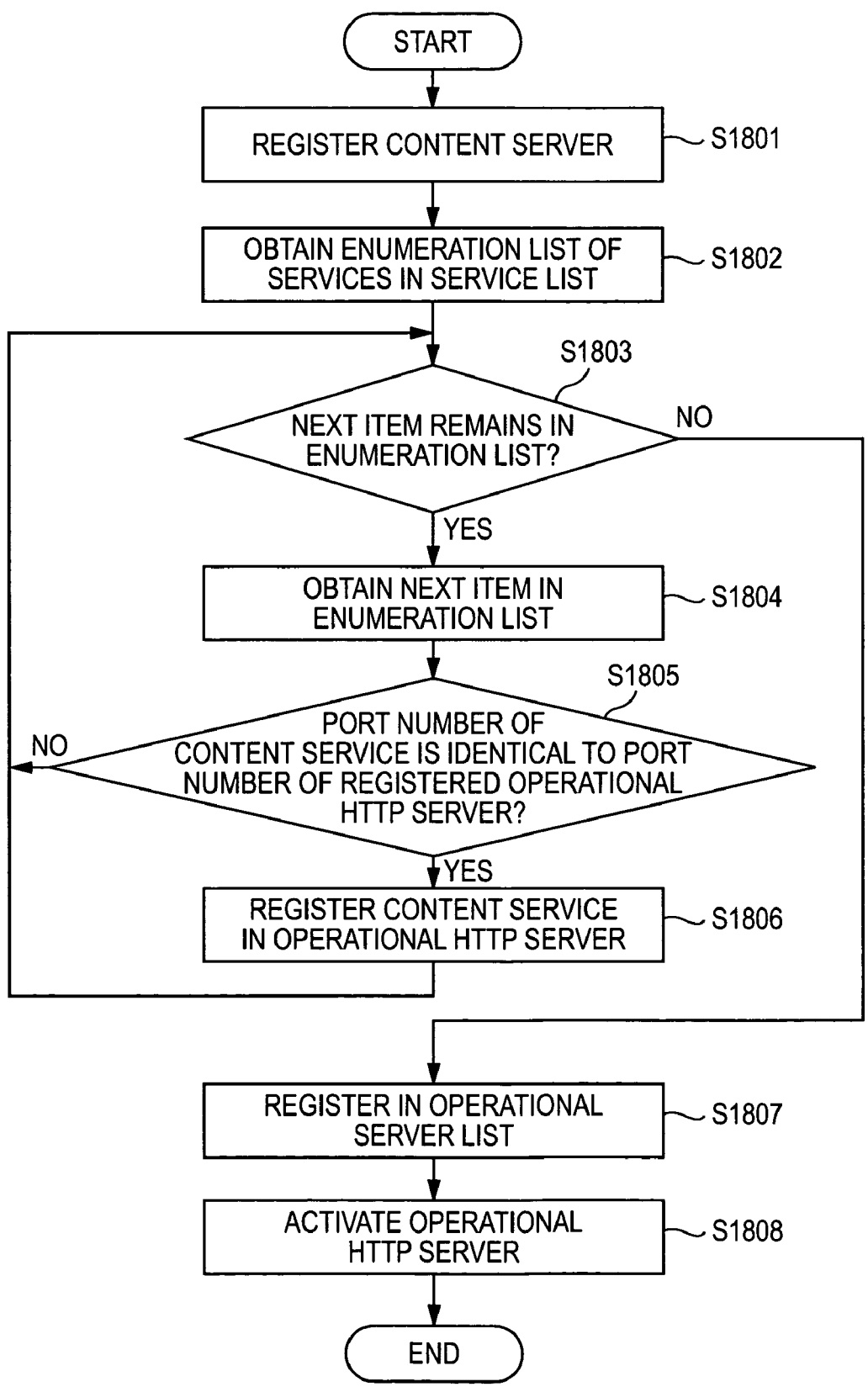
FIG. 16 is a flowchart showing an operational HTTP server registration process in the second embodiment.
Figure 17:
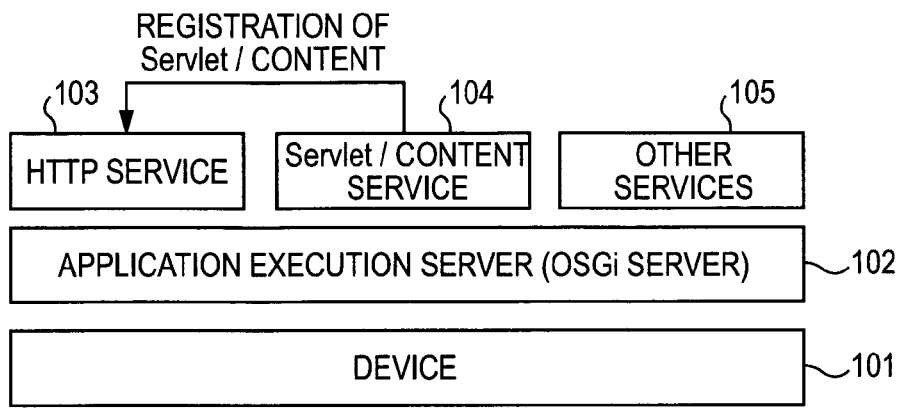
FIG. 17 is a diagram showing an example structure of an application execution server.
Figure 18:
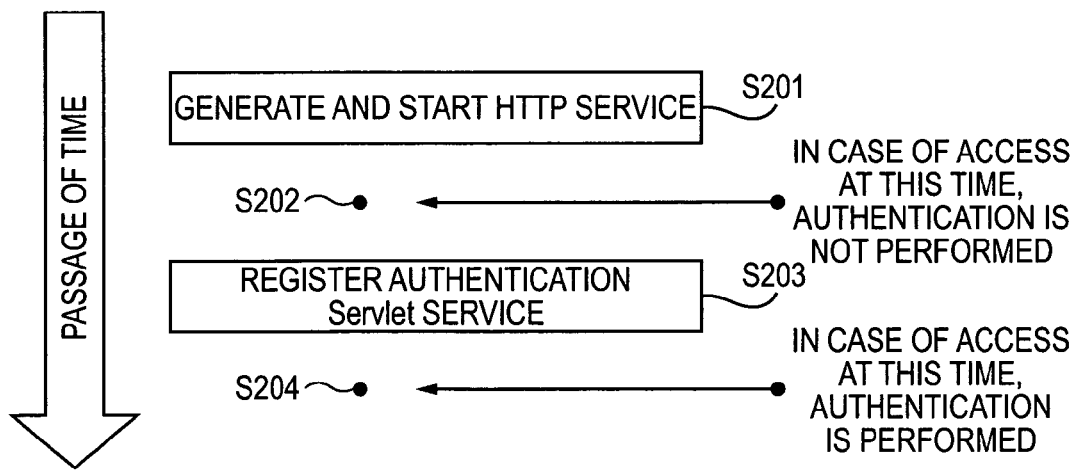
FIG. 18 is a time chart showing a service sequence of the related art.
Figure 19:
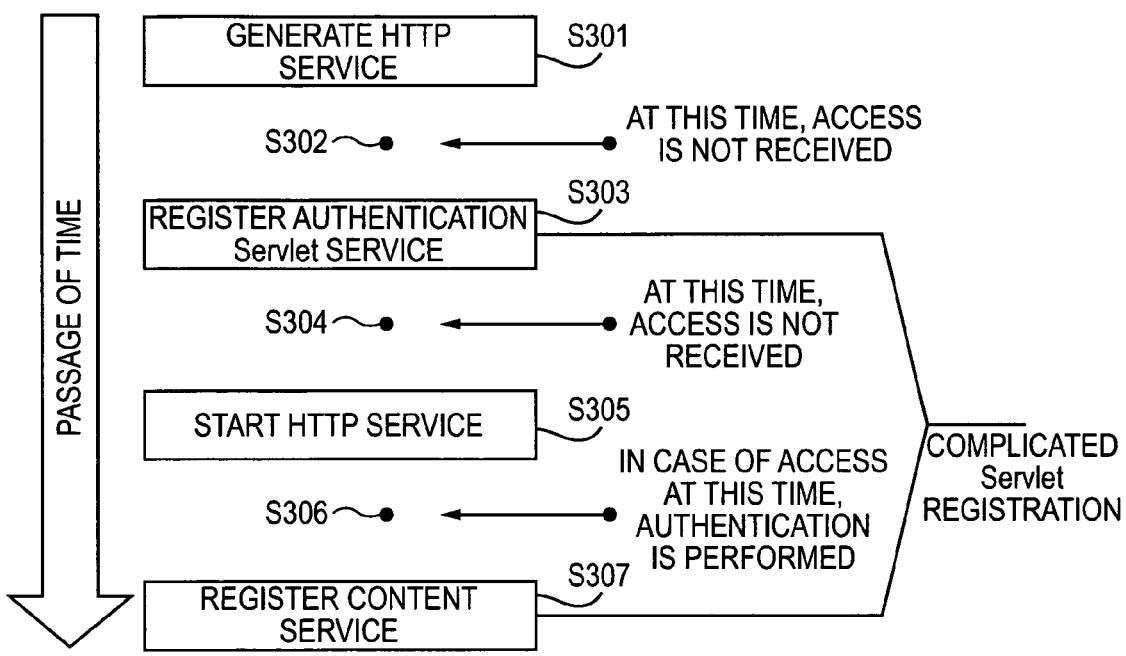
FIG. 19 is a time chart showing a service sequence of the related art.

FIG. 15 is a flowchart showing a content service registration process according to the second embodiment. FIG. 16 is a flowchart showing an operational HTTP server registration process according to the second embodiment.

Referring to FIG. 15, first, the content service 403 is registered in the contact HTTP server 401 (step S1901). The contact HTTP server 401 accesses the operational server list 407 shown in FIG. 14, and searches for the operational HTTP server corresponding to the network port number specified by the content service from the port number column 1702 (step S1902). At this point in time, no operational HTTP server service 405 has been activated, and there is no operational HTTP server 405 registered in the operational server list 407 (No in step S1902). Then, the content service 403 is registered in the service list 408 shown in FIG. 13 in association with the network port number (step S1904).

After activation of the content service 403 is completed, the operational HTTP server 405 is activated. Referring to FIG. 16, the operational HTTP server 405 obtains, in its activation sequence, the server registration interface 404 of the contact HTTP server 401 registered in the application execution server 803. The operational HTTP server 405 registers itself and the network port on which this operational HTTP server 405 operates in the contact HTTP server 401 using the server registration interface 404 (step S1801; step S411 shown in FIG. 3).

When the operational HTTP server 405 is registered, the contact HTTP server 401 obtains an enumeration (enumeration list) of content services 403 from the service list 408 shown in FIG. 13 (step S1802). The enumeration (enumeration list) is a list having functions for returning items one after another from the first item in the list in response to a request for a next item and returning a response as to whether or not the next item is present.

Next, it is determined whether or not the next item is present in the enumeration list (step S1803). If the next item is not present (No in step 1803), the operational HTTP server 405 is registered in the operational server list 407 shown in FIG. 14 (step S1807) and the operational HTTP server 405 is activated (step S1808).

On the other hand, if the next item is present in the enumeration list (Yes in step S1803), the next item in the enumeration list is obtained (step S1804). It is determined whether or not the network port number of the obtained content service is identical to the network port number of the operational HTTP server service 405 which is currently registered (step S1805).

If they are not identical (No in step S1805), the flow returns to step S1803. If they are identical (Yes in step S1805), the content service 403 is registered in the operational HTTP server 405 (step S1806). Then, the flow returns to step S1803.

The operational HTTP server service 405 stores in the service list 415 shown in FIG. 13 the content service 403 registered from the contact HTTP server service 401 in step S1806 (step S416 shown in FIG. 3). After the content service 403 is registered in the operational HTTP server service 405, the operational HTTP server 405 opens the server port, and starts receiving access from a client.

One of a plurality of operational HTTP servers 405 each provided for each network port via which an HTTP request is received may be registered in the operational HTTP server service 405.

The activation sequence of the operational HTTP server service 405 is implemented by the operational HTTP server 405, and the registration of the operational HTTP server 405 in the contact HTTP server 401 is also a closed process between the contact HTTP server 401 and the operational HTTP server 405. Thus, it is only required that the application execution server 803 activates the operational HTTP server 405.

After activation of the operational HTTP server 405, when the content service 403 is activated, the content service 403 registers, in its activation sequence, itself in the contact HTTP server 401 using the content service registration interface 402.

That is, in FIG. 15, the content service 403 is registered in the contact HTTP server 401 (step S1901). Then, the contact HTTP server 401 accesses the operational server list 407 shown in FIG. 14, and searches for the operational HTTP server corresponding to the network port number specified by the content service using the port number column 1702 (step S1902). The operational HTTP server 405 operating on the network port specified by the content service 403 has been registered at this point in time (Yes in step S1902). Then, the operational HTTP server 405 operating on the network port specified by the content service 403 is obtained from the operational server list 407 shown in FIG. 14. The content service 403 is registered in the operational HTTP server 405 using the operational content service registration interface 406 of the operational HTTP server service 405 (step S1903). The content service 403 is then registered in the service list 408 shown in FIG. 13 (step S1904).

With the above-described configuration of the contact HTTP server 401 and the operational HTTP server 405, as in the first embodiment, the operation flow of the system is executed according to the flowchart shown in FIG. 10.

According to the second embodiment, therefore, the advantages of the first embodiment can also be achieved in an environment for specifying the network port number on which the operational HTTP server 405 that can invoke a content service operates.

Other Embodiments

While the embodiments have been described in detail, the present invention may be embodied in various forms, such as a system, an apparatus, a method, a program, or a storage medium. Specifically, the present invention may be applied to a system constructed by a plurality of devices or an apparatus including a single device.

The contact HTTP server 401 and the operational HTTP server 405 according to the first or second embodiment may be implemented as, for example, a program. Recording media storing this program may include a compact disc read-only memory (CD-ROM), a floppy disk, a hard disk, and a memory card.

The present invention may be achieved by providing a program implementing the features of the embodiments described above to a system or an apparatus directly or remotely so that a computer of the system or the apparatus reads and executes the program code. The program includes a program corresponding to each of the flowcharts described in the above-described embodiments.

Thus, the program code installed into a computer to achieve the processing functions of the present invention on the computer is within the scope of the present invention. That is, the computer program for realizing the processing functions of the present invention also falls within the scope of the present invention.

In this case, the program may be object code, a program executed by an interpreter, script data supplied to an operating system (OS), or the like, as long as it functions as a program.

A recording medium for supplying the program may be a floppy disk, a hard disk, an optical disk, a magneto-optical (MO) disk, a CD-ROM, a CD recordable (CD-R), a CD rewritable (CD-RW), a magnetic tape, a memory card, a ROM, or a digital versatile disc (DVD) (DVD-ROM or DVD-R).

Alternatively, the program may be obtained by accessing a Web page on the Internet using a computer and downloading a computer program according to the present invention or a compressed program from the Web page to a recording medium such as a hard disk. Yet alternatively, program code of a program according to the present invention may be divided into a plurality of files and the files may be downloaded from different Web pages. That is, a WWW (World Wide Web) server that allows a plurality of users to download a program file for achieving processing functions of the present invention using a computer falls within the scope of the present invention.

Furthermore, a program according to the present invention may be encrypted and stored on a storage medium for distribution to a user so that the user is allowed to download key information for decryption from a Web page. The user may use the key information to execute the encrypted program and install the program into a computer.

Furthermore, the functions of the embodiments may be achieved by an operating system running on the computer or the like executing actual processing in part or in entirety according to the program read by the computer.

Furthermore, a program read from a recording medium may be written to a memory of a function extending unit inserted in or connected to the computer so that a CPU or the like of the function extending unit executes actual processing in part or in entirety according to the program, thereby achieving the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-335007 filed Nov. 18, 2004, which is hereby incorporated by reference herein in its entirety.

What is claimed is:

1. An information processing apparatus for providing a service in response to a request from a user, the information processing apparatus comprising:

a storage unit configured to store a service program that implements the service including an authentication service, an operational server program that receives the request and that controls processing in accordance with the service program in response to the request, and a contact program in which the service program and the operational server program are registered to set up an environment for executing the registered service program and operational server program; and a controller configured to perform control so that the request to the operational server program is ensured to be received in a state where the authentication service implemented by the service program is active by performing the following steps (a) to (e) in order, (a) activating the contact program, (b) starting the service program after the contact program is activated and registering the service program in the contact program, (c) generating the operational server program after the service program is started and registering the operational server program in the contact program, (d) registering the service program in the operational server program registered in the contact program, and (e) activating the operational server program in which the service program is registered, where the steps (c) to (e) are performed atomically, so that the operational server program can be ensured to receive the request from the user in a state where the authentication service included in the service program is active in the operational server program.

2. The information processing apparatus according to claim 1, wherein the contact program includes:

an operational server program registering module for registering the operational server program in the contact program; and a service program registering module for registering in the operational server program the service program registered in the contact program.

3. The information processing apparatus according to claim 1, wherein the operational server program includes:
   a registering module for registering the service program in the operational server program;
   an operational server program registering module for registering the operational server program in the contact program; and
   an executing module for calling and executing the service program registered in the operational server program in response to the request.

4. The information processing apparatus according to claim 1, wherein the service program comprises a hypertext transfer protocol service program that implements a hypertext transfer protocol service,
   the contact program comprises a cooperation program that does not perform hypertext transfer protocol processing and that performs processing in cooperation with the operational server program, and
   the operational server program comprises a hypertext transfer protocol processing program that performs hypertext transfer protocol processing and that performs processing in cooperation with the contact program.

5. The information processing apparatus according to claim 1, wherein the service program specifies a network port on which the service program operates,
   the contact program includes a first managing module for managing the service program and information relating to the network port specified by the service program, and
   the operational server program includes a second managing module for registering service programs from the contact program, each service program corresponding to a network port via which the request is received, and managing the service programs.

6. A method for controlling an information processing apparatus for providing a service in response to a request from a user, the method comprising:
   a storing step of storing in a storage unit a service program that implements the service including an authentication service, an operational server program that receives the request and that controls processing in accordance with the service program in response to the request, and a contact program in which the service program and the operational server program are registered to set up an environment for executing the registered service program and operational server program; and
   a controlling step of performing control so that the request to the operational server program is ensured to be received in a state where the authentication service implemented by the service program is active by performing the following steps (a) to (e) in order, (a) activating the contact program, (b) starting the service program after the contact program is activated and registering the service program in the contact program, (c) generating the operational server program after the service program is started and registering the operational server program in the contact program, and (d) registering the service program in the operational server program registered in the contact program, and (e) activating the service operational server program in which the service program is registered in the contact program, where the steps (c) to (e) are performed atomically, so that the operational server program can be ensured to receive the request from the user in a state where the authentication service included in the service program is active in the operational server program.

7. The method according to claim 6, wherein the contact program includes:
   an operational server program registering module for registering the operational server program in the contact program; and
   a service program registering module for registering in the operational server program the service program registered in the contact program.

8. The method according to claim 6, wherein the operational server program includes:
   a registering module for registering the service program in the operational server program;
   an operational server program registering module for registering the operational server program in the contact program; and
   an executing module for calling and executing the service program registered in the operational server program in response to the request.

9. The method according to claim 6, wherein the service program comprises a hypertext transfer protocol service program that implements a hypertext transfer protocol service,
   the contact program comprises a cooperation program that does not perform hypertext transfer protocol processing and that performs processing in cooperation with the operational server program, and
   the operational server program comprises a hypertext transfer protocol processing program that performs hypertext transfer protocol processing and that performs processing in cooperation with the contact program.

10. The method according to claim 6, wherein the service program specifies a network port on which the service program operates,
    the contact program includes a first managing module for managing the service program and information relating to the network port specified by the service program, and
    the operational server program includes a second managing module for registering service programs from the contact program, each service program corresponding to a network port via which the request is received, and managing the service programs.

11. A non-transitory computer-readable storage medium having stored thereon a computer program for controlling a computer to provide a service in response to a request from a user, the program comprising:
    program code for storing in a storage unit a service program that implements the service including an authentication service, an operational server program that receives the request and that controls processing in accordance with the service program in response to the request, and a contact program in which the service program and the operational server program are registered to set up an environment for executing the registered service program and operational server program; and
    program code for performing control so that the request to the operational server program is ensured to be received in a state where the authentication service implemented by the service program is active by performing the following steps (a) to (e) in order, (a) activating the contact program, (b) starting the service program after the contact program is activated and registering the service program in the contact program, (c) generating the operational server program after the service program is started and registering the operational server program in the contact program, (d) registering the service program in the operational server program registered in the contact program, and (e) activating the service operational server program in which the service program is registered in the contact program, where the steps (c) to (e) are performed atomically, so that the operational server program can be ensured to receive the request from the user in a state where the authentication service included in the service program is active in the operational server program.

12. The non-transitory computer-readable storage medium according to claim 11, wherein the contact program includes:
an operational server program registering module for registering the operational server program in the contact program; and
a service program registering module for registering in the operational server program the service program registered in the contact program storing module.

13. The non-transitory computer-readable storage medium according to claim 11, wherein the operational server program includes:
a registering module for registering the service program in the operational server program;
an operational server program registering module for registering the operational server program in the contact program; and
an executing module for calling and executing the service program registered in the operational server program in response to the request.

14. The non-transitory computer-readable storage medium according to claim 11, wherein the service program comprises a hypertext transfer protocol service program that implements a hypertext transfer protocol service,
the contact program comprises a cooperation program that does not perform hypertext transfer protocol processing and that performs processing in cooperation with the operational server program, and
the operational server program comprises a hypertext transfer protocol processing program that performs hypertext transfer protocol processing and that performs processing in cooperation with the contact program.

15. The non-transitory computer-readable storage medium according to claim 11, wherein the service program specifies a network port on which the service program operates,
the contact program includes a first managing module for managing the service program and information relating to the network port specified by the service program, and
the operational server program includes a second managing module for registering service programs from the contact program, each service program corresponding to a network port via which the request is received, and managing the service programs.

* * * * *